Sept. 4, 1945.   J. K. SIMPSON   2,384,201
LOCKING DEVICE FOR REMOTE CONTROL AND
OTHER FORCE TRANSMITTING SYSTEMS
Filed July 17, 1944   3 Sheets-Sheet 2
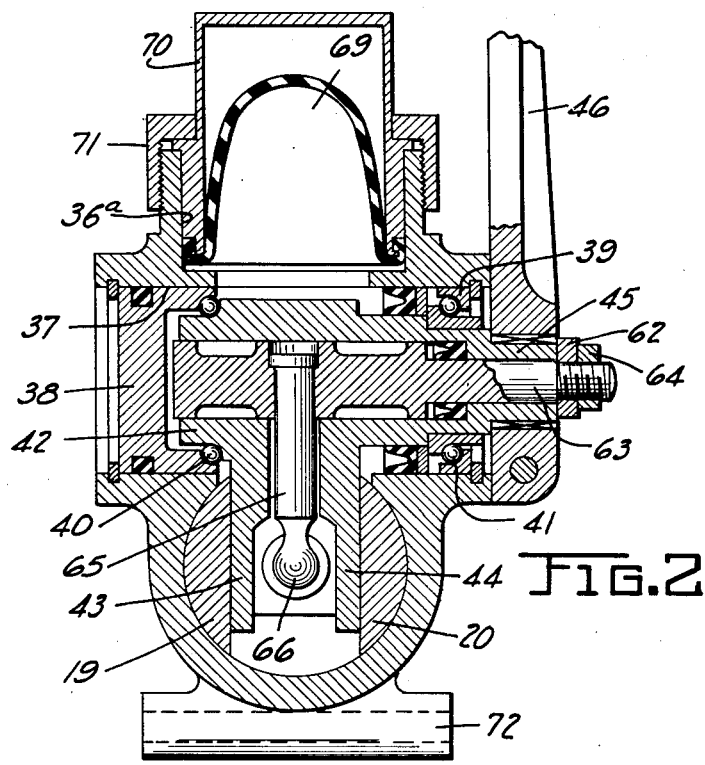
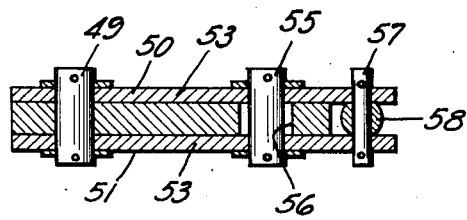
INVENTOR
JOHN KEITH SIMPSON
BY Cecil D. Arena
ATTORNEY

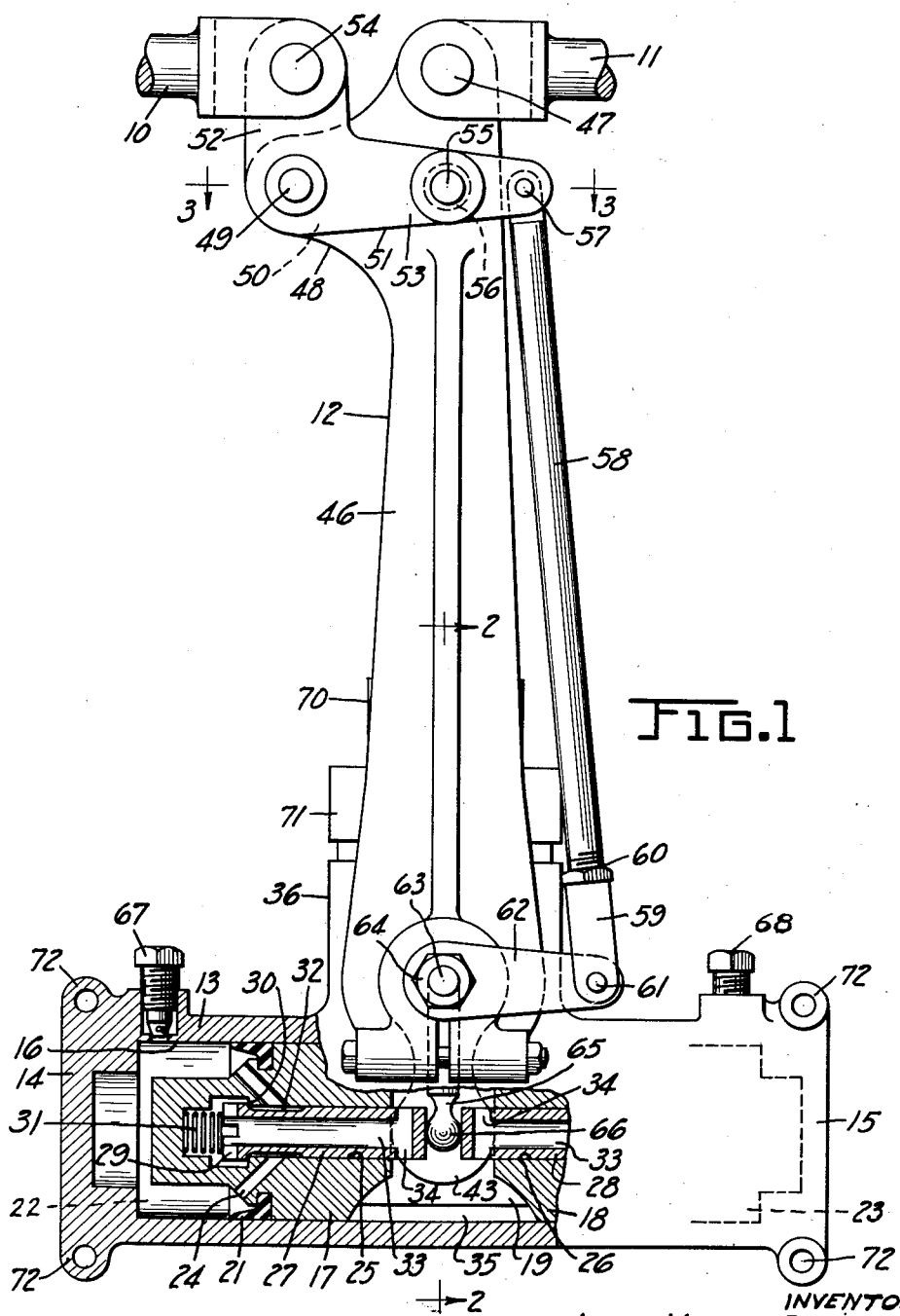

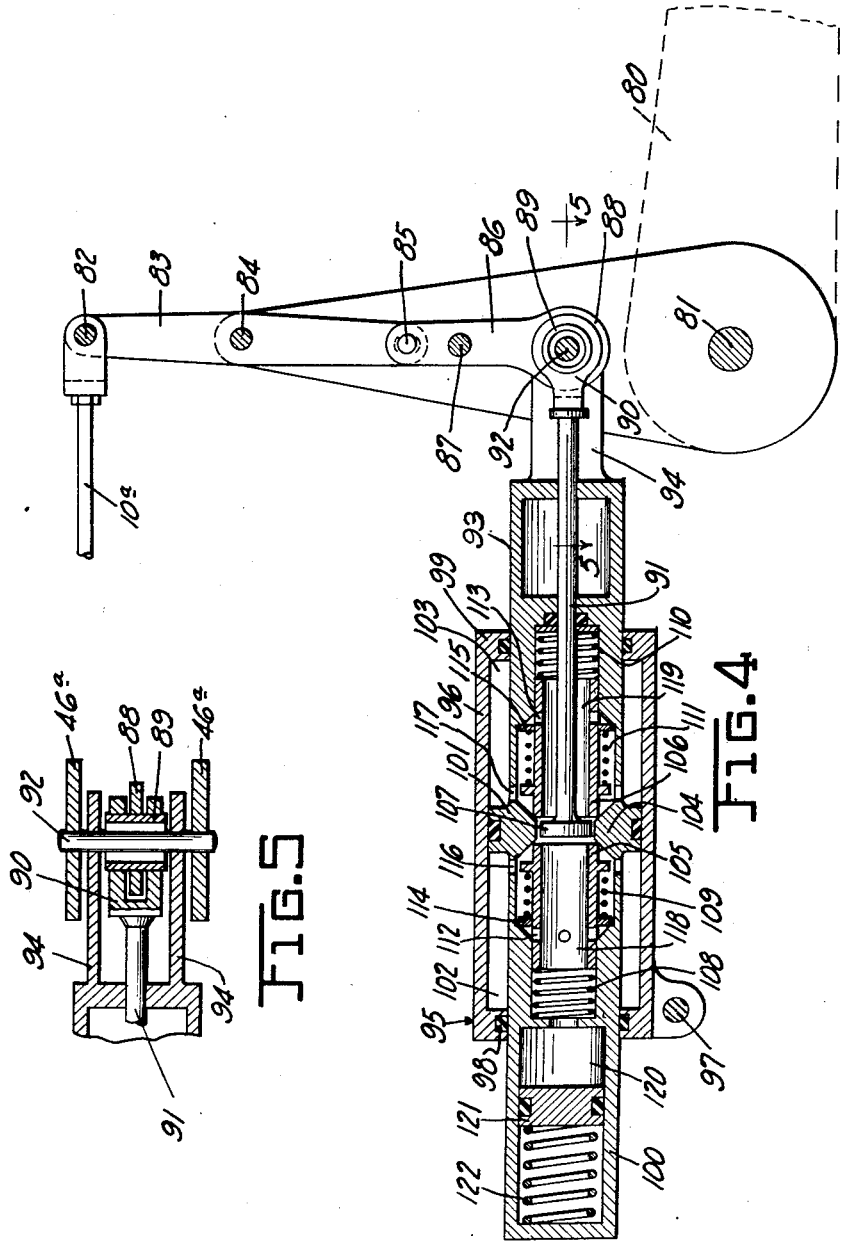

Patented Sept. 4, 1945

2,384,201

UNITED STATES PATENT OFFICE 2,384,201

LOCKING DEVICE FOR REMOTE CONTROL AND OTHER FORCE TRANSMITTING SYSTEMS

John Keith Simpson, Leamington Spa, England, assignor to Automotive Products Company Limited, Leamington Spa, England Application July 17, 1944, Serial No. 545,358
In Great Britain February 12, 1943

7 Claims. (Cl. 74—469)

This invention relates to locking devices for remote control and other force-transmitting systems.

In remote control systems and other systems of a similar nature, it is often desirable to prevent the actuated member from moving under the influence of externally applied forces, with the exception, of course, of those forces which are received from the actuating member of the system. For example, in a remote control system for operating control surfaces of an aircraft, it is important that the control surfaces should be supported sufficiently rigidly to prevent their setting from being changed by external forces such as those produced by drag or lift during the flight of the aircraft; despite this, however, the control surfaces should be capable of being adjusted freely from one position to another through the medium of the appropriate controlling mechanism, which is operated by the pilot.

Locking devices for the purpose above set out have been proposed, which comprise a cylinder rigidly mounted in the aircraft and having a plunger dividing its interior into two spaces, the plunger being connected by a rod projecting from one end of the cylinder to the control surface or the like to be operated, and the controlling mechanism being connected by a rod projecting from the other end of the cylinder to a valve device in the plunger, which valve controls the flow of liquid from one side to the other of the piston. The locking device thus forms an actual part of the force-transmitting mechanism between the pilot's control and the control surface, and the controlling mechanism has a degree of lost motion with respect to the control surface, dependent on the movement required to operate the valve. It is customary to incorporate levers in the controlling mechanism which give a mechanical advantage, so that the load on the pilot's control is only a fraction of any load acting to resist the movement of the control surface. If the locking device is placed between these levers and the control surface, which is preferable so as to relieve the controlling system of loading except during actual operation of the control surface, and to reduce as much as possible the additional effort required on the pilot's control due to friction in the locking device, the lost motion needed to open the valve is multiplied by the amount of mechanical advantage in the controlling system, and thus the lost motion at the pilot's control is considerable. If, on the other hand, the locking device is placed between these levers and the pilot's control, the lost motion for opening the valve is not multiplied, but the necessary length of the cylinder of the locking device is multiplied by the degree of mechanical advantage in the system, the greater part of the controlling system is constantly under load, and the frictional resistance in the locking device is applied directly to the pilot's control.

The object of the present invention is to provide an arrangement whereby the locking device is of small dimensions, and is operable with only very slight lost motion of the pilot's control, or equivalent, and does not substantially increase the effort required to move the actuated member.

In an automatic locking device for a mechanical controlling system comprising an actuating member, an actuated member connected with the actuating member by a lost motion device, a locking device connecting the actuated member to a fixed anchorage, releasing means which move with the actuated member and are operated by the limited initial movement of the actuating member permitted by the lost motion device, the present invention is characterised by the fact that a movement increasing mechanism is interposed between the actuating member and the releasing means whereby a small initial movement of the actuating member permitted by the lost motion connection serves to move the releasing means by an increased distance.

According to a further aspect of the invention an automatic hydraulic locking device is provided comprising an actuating member, an actuated member connected with the actuating member by a lost motion connection, a locking chamber which contains liquid and becomes reduced in volume as the actuated member is moved, and a valve device arranged to be opened by the actuated member in taking up the lost motion, thus allowing liquid to escape from said locking chamber as the movement of the actuating member proceeds, characterised by the fact that a movement increasing mechanism is interposed between the actuating member and the valve device whereby a small initial movement of the actuating member permitted by the lost motion connection serves to open the valve by an increased distance.

Preferably a leverage mechanism is interposed between the locking means and the actuated member whereby a relatively large movement of said actuated member brings about only a small movement of that part of the locking means connected with the actuated member. The locking means can comprise a cylinder, and a plunger slidable therein to form the locking chamber of variable volume. Conveniently the plunger of the locking device is connected to a main lever connected without lost motion to the actuated member, and the actuating member is connected to an auxiliary lever pivoted on the main lever and itself operatively connected to the valve of the locking device, the arrangement being such that on completion of the valve-opening movement the main and auxiliary levers move as one to transmit the operating force from the actuating member to the actuated member, the effective length of the combined levers between the fulcrum of the main lever and the connection of the actuating member to the second lever, if desired, being greater than the distance between the fulcrum of the main lever and its connection to the plunger of the locking device. The arm of the auxiliary lever which operates the valve of the locking device is preferably longer than the arm which is coupled to the actuating member, so that the lost motion at the latter is less than that needed to open the valve.

The invention is illustrated by way of example in the accompanying drawings, in which:

Figure 1 is a part-sectional side elevation of one form of locking device;

Figure 2 is a fragmentary sectional end elevation taken on the line 2—2 of Figure 1;

Figure 3 is a sectional plan taken on the line 3—3 of Figure 1;

Figure 4 is a diagrammatic sectional side elevation of a modified mechanism; and Figure 5 is a fragmentary sectional plan taken on the line 5—5 of Figure 4.

In the automatic locking device shown in Figures 1 to 3 the actuating member is indicated at 10 and is in the form of a link connected with a hand lever or other operating device (not shown) so as to be capable of transmitting both pushing and pulling forces to an actuated member 11. The latter is also in the form of a link and is connected at its distant end (not shown) with the aircraft flap, aileron, or other device required to be actuated. A locking device, indicated generally at 12, is interposed between the adjacent ends of the actuating member 10 and the actuated member 11 for the purpose of preventing movement of the actuated member 11 by any externally applied force other than that received from the actuating member 10. Thus wind drag and other forces which might act upon the flap or aileron or equivalent are unable to affect the setting thereof, and yet said setting can be readily readjusted when required by movement of the actuating member 10.

The locking device 12 is hydraulic and comprises a cylinder 13 closed at both ends as indicated at 14 and 15, and provided with a bore 16 containing a pair of freely slidable pistons 17 and 18. These are arranged back to back and are permanently connected together by a pair of integral side members 19 and 20 (see Figure 2). Each piston is fitted with a packing cup 21 serving to prevent the escape of liquid past the piston from the adjacent working space 22 or 23 at the end parts of the cylinder bore 16. The front part of each piston is, however, formed with a number of oblique passages 24 communicating with an axial bore 25 or 26, these bores containing mushroom type valve members 27 and 28. Both valves are of identical construction and each has a head 29 adapted to seat upon an annular shoulder 30 under the action of a coiled compression spring 31. Just below the head 29 the stem portion of each valve member 27 or 28 is reduced to form an annular space 32, which is in permanent communication with the passages 24. Each valve member 27 and 28 is further provided with a longitudinal passage 33 extending completely through the head and communicating with a diametral passage 34 where the valve member projects from the back end of the piston 17 or 18. The springs 31 normally hold the valves 27 and 28 in their closed positions and thus cause the working spaces 22 and 23 each to be isolated from a space 35 between the pistons 17 and 18.

At its middle part the cylinder 13 is formed with an upward extension 36, which is bored transversely at 37 for the reception of a pair of end race members 38 and 39. These support in a freely rotatable manner, by means of two sets of balls 40 and 41, a transverse spindle 42 which is tubular in form and is provided with a bifurcated depending arm, the two limbs of said arm being indicated at 43 and 44 in Figure 2. The arm 43, 44 fits snugly between the pistons 17 and 18 and causes said pistons to slide along the cylinder bore 16 as the arm moves angularly. The spindle 42 has an externally splined axial projection 45 to which is fitted the lower end of a main lever 46, so that angular movement of said main lever is imparted to the spindle 42 and thence to the arm 43, 44. The upper end of the main lever 46 is pivotally connected at 47 with the actuated member 11 and it is also formed with a projection 48 carrying a fulcrum pin 49 for an auxiliary bell crank lever. This comprises a pair of twin stampings 50 and 51 disposed one on each side of the main lever 46; the arms of the bell crank lever are indicated at 52 and 53. The arm 52 is considerably shorter than the arm 53 and is pivotally connected at 54 with the actuating member 10. A pin 55 fits snugly in holes in the arms 53 and passes with substantial but prescribed clearance through a hole 56 in the main lever 46 so as to act as a lost motion device for limiting the permissible vertical movement of the arm 53 relative to the main lever 46. At its free end the arm 53 is pivotally connected at 57 with a rod-like link 58 having at its lower end a bifurcated fitting 59 incorporating a screw-threaded adjustment 60. The fitting 59 is pivoted at 61 to an arm 62 secured firmly to a spindle 63 by means of a nut 64. As will be seen in Figure 2, this spindle 63 is rotatably mounted within a spindle 42 and it carries a radial valve operating arm 65, which extends downwards between the piston operating arms 43 and 44. The lower end of the valve operating arm 65 is somewhat ball-shaped, as indicated at 66, and fits with only slight clearance between the adjacent ends of the valve members 27 and 28.

The two ends of the cylinder 13 are provided with bleeder plugs 67 and 68 adapted in the usual manner for the removal of trapped air. The working liquid is inserted into the cylinder through the filling orifice 36a in the upward extension 36, liquid being fed thereinto with the bleed plugs 67 and 68 open, so that liquid completely fills the spaces 22, 23 and 35 within the cylinder, and extends upwards past the spindle 42 to the top of the filling orifice. A cylindrical protective cover 70, containing a flexible rubber sac 69 is then pushed into the filling orifice and secured in position by means of a union nut 71, the liquid being thus placed under pressure.

The operation of the device shown in Figures 1 to 3 is as follows. Supposing that said device is to be installed in the mechanism for working the flaps of an aircraft, the cylinder 13 is securely fastened to the wing or fuselage of the aircraft by means of bolts passing through lugs 72. The actuated member 11 is connected with the flap or flaps and the actuating member 10 is connected with the pilot's operating lever. It will therefore be seen that the main lever 46 moves in common with the flap and the latter can only be moved by external forces so long as the main lever 46 is correspondingly movable. Normally, however, the springs 31 hold both of the valve members 27 and 28 in their closed positions, the valve operating arm 65 being thereby centralised between the pistons 17 and 18 so that the latter are rendered immovable within the cylinder 13 due to the action of the working liquid which is trapped in the spaces 22 and 23. As the working liquid is incompressible it follows that the main lever 46 cannot move and therefore the flap is positively locked in position. In Figure 1 the main lever 46 is shown at the mid position of its available stroke, but it will be understood that the same locking action occurs at every position within said stroke. When the actuating member 10 is moved, however, say to the right, it moves the bell crank lever 50, 51 slightly in a clockwise direction upon the main lever 46 as far as is permitted by the lost motion device 55, 56, the link 58 and arm 62 being moved downwardly so as to cause valve operating arm 65 to shift the valve member 27 to its open position. Therefore the piston 17 is able to move toward the left as liquid from the cylinder space 22 escapes through the passages 74 past the valve seating and through the longitudinal passage 33 into the intermediate space 35. Once the valve member 27 has been opened by taking up the lost motion in the device 55, 56, further movement of the actuating member 10 is imparted directly to the upper end of the main lever 46 through the fulcrum pin 49 and is consequently imparted to the actuated member 11. During this movement liquid from the intermediate space 35 can flow relatively freely into the enlarging space 23 by way of the usual clearance between the piston 18 and the cylinder bore 16, the packing cup 21 of the piston 18 serving as a one-way valve in the manner common to the piston packings of hydraulic master cylinders. The same action occurs when a movement of the flap in the opposite direction is required, tension being imparted to the actuating member 10. The initial part of the movement of the actuating member 10, in taking up the lost motion in the device 55, 56 lifts the link 58 and consequently opens the valve member 28, so that liquid is able to escape freely from the working space 23 as the main lever 46 moves in an anti-clockwise direction, carrying with it the actuated member 11.

The arrangement shown in Figures 4 and 5 shows the adaptation of the invention to a locking device of the form described in the specification of co-pending patent application Serial No. 374,137, filed January 11, 1941, and issued as Patent No. 2,365,247 on December 19, 1944. A flap or other controllable aerofoil is indicated in broken lines at 80 and is arranged to move angularly about a pivot 81, a main lever 46a being rigidly attached to the aerofoil 80 for this purpose. For convenience in design this lever 46a is of twin construction, as will be seen in Figure 5. A link 10a, capable of pushing as well as pulling, constitutes the actuating member of the device, while the aerofoil 80 is, of course, the actuated member. The actuating member 10a is pivotally connected at 82 to the upper end of an auxiliary lever 83 which is conveniently of twin construction, although, owing to the sectional nature of Figure 4, only one lever 83 is shown therein. Approximately halfway along its length the lever 83 is mounted pivotally upon the extremity of the main lever 46a by means of a pin 84, while the lower end of said lever 83 is connected by a pivot pin 85 to the upper end of a releasing lever 86, the pivot pin 85 being entirely free from the main lever 46a. The releasing lever 86 is, however, pivoted to the main lever 46a by a pin 87, which is disposed only a short distance from the upper end of said releasing lever 86 so as to produce the desired movement magnifying effect for the releasing means. At its lower end the releasing lever 86 is enlarged to form an eye 88 fitting pivotally upon a bush 89 of relatively large diameter. This tubular bush 89 is fitted snugly within the arms of a bifurcated member 90 upon a valve releasing rod 91, while extending through said bush 89 with prescribed freedom to move regularly is a pin 92 reaching from one part to the other of the composite main lever 46a. Also pivotally connected to the pin 92 is a locking plunger 93 having a pair of lugs 94 each extending between the bush 89 and one of the parts of the main lever 46a.

The locking device includes a hydraulic unit, which is indicated generally at 95 and is of the form described in the above-mentioned patent application. It comprises briefly a cylinder 96, which is anchored at 97 to, say, the wing of the aircraft, and has annular end walls 98 and 99 through which a plunger 100 slides in a fluid-tight manner. At its middle part the plunger 100 has a fluid-tight piston 101 dividing the interior of the cylinder 96 into two annular working spaces 102 and 103. The plunger 100 is hollow and is constricted at its middle part by an inwardly directed flange 104 of trapezoidal cross-section forming frusto-conical seatings for a pair of tubular valve members 105 and 106. The space between the seating ends of these valve members is occupied by a head 107 formed upon the inner end of the releasing rod 91, the arrangement being such that movement of said head 107 in either direction away from its centralised position causes one or other of the valve members 105 or 106 to be unseated from the flange 104 against the action of springs 108, 109 or of springs 110, 111 respectively. The outer parts of the valve members 105 and 106 have ports 112 and 113 respectively, which act in conjunction with annular valve members 114 and 115, these being normally held in their closed positions by the springs 109 and 111. The working spaces 102 and 103 are in permanent communication through ports with the spaces surrounding the valve members 105 and 106 respectively, while the spaces 118 and 119 within said valve members are both fed with working liquid from a reservoir space 120 at one end of the plunger 100. A floating piston 121 acted upon by a spring 122 serves to maintain the liquid within the hydraulic unit at a slight pressure above atmospheric, so as to ensure that all the working spaces are kept full of liquid.

Normally the head 107 of the releasing rod 91 is centralised by the valve members 105 and 106, and as both of these valve members are closed, it follows that the piston 101 and plunger 100 are positively locked against movement, for liquid is unable to escape from either of the working spaces 102 or 103. As the lugs 94 of the plunger 100 are snugly pivoted to the main lever 46a, it follows that the flap 80 or actuated member is correspondingly locked in position. To raise the flap 80 the actuating member 10a is moved to the left; this deflects the lower end of the auxiliary lever 83 to the right and therefore causes the eye 88 of the releasing lever 86 to be moved towards the left by a greater distance than the movement of the actuating member 10a owing to the leverage afforded by said releasing lever 86. Therefore a very slight movement of the actuating member 10a is sufficient to cause the releasing rod 91 to press open the valve 105, thus enabling liquid to escape from the working space 102, through the ports 116, past the seating of the valve member 105, through the constriction 104, through ports 113, and thence, by opening the annular valve 115, said liquid can flow through the ports 117 into the working space 103. This enables the plunger 100 to be moved to the left so long as the valve 105 is held open, i. e. so long as the actuating member 10a is correspondingly moved; as soon as the operating force is removed from the actuating member 10a, however, the head 107 becomes centralised, and the valve 105 closes so as to lock the plunger 100 in its new position. The same action occurs when thrust is imparted to the actuating member 10a to lower the flap 80, the head 107 in this instance causing the valve 106 to be opened.

The two arrangements described above are given by way of example only, and modifications can, of course, be made in the details of the mechanical linkage, or of the locking device itself.

What I claim is:

1. An automatic hydraulic locking device comprising an actuating member, an actuated member, means including a lost motion connection connecting the actuating member to the actuated member, a locking chamber having liquid therein, the volume of liquid in said chamber being reduced as the actuated member is moved, a valve device arranged to be opened by the actuating member in taking up the lost motion, thus allowing liquid to escape from said locking chamber as the movement of the actuating proceeds, and a movement increasing mechanism including an auxiliary lever connecting the actuating member and the valve device whereby a small initial movement of the actuating member permitted by the lost motion connection serves to open the valve by an increased distance, a plunger in the locking chamber, a main lever connected to the actuated member and operatively connected to the plunger, said auxiliary lever being pivoted on the main lever and connected to the actuating member so that on completion of the valve-opening movement the main and auxiliary levers move as one to transmit the operating force from the actuating member to the actuated member.

2. A locking device as claimed in claim 1, wherein the effective length of the combined levers between the fulcrum of the main lever and the connection of the actuating member to the auxiliary member is greater than the distance between the fulcrum of the main lever and its connection to the plunger.

3. A locking device as claimed in claim 1, wherein the length of the auxiliary lever from its pivot point to where the lever connects the valve device is longer than the length of the auxiliary lever from its pivot point to where the lever connects the actuating member, so that the lost motion at the latter is less than that needed to open the valve.

4. An automatic locking device for a mechanical controlling system comprising an actuating member, an actuated member, a lost motion device connecting the two members, a locking means comprising a pair of rigidly connected pistons each having a longitudinal passage and arranged back to back within a double-ended cylinder containing liquid, the locking means connecting the actuated member to a fixed anchorage, releasing means comprising a pair of valves, carried respectively by the pistons and each arranged to control the flow of liquid through the longitudinal passage of its corresponding piston, said releasing means being constructed and arranged to move with the actuated member and operated by the limited initial movement of the actuating member permitted by the lost motion device, and a movement increasing mechanism disposed between the actuating member and the releasing means whereby a small initial movement of the actuating member permitted by the lost motion connection serves to move the releasing means by an increased distance.

5. A locking device as claimed in claim 4, wherein the valves are selectively operated, a lever extending into the cylinder between the pistons and moved by the actuating member in the same direction as it is desired to move the pistons.

6. A locking device as claimed in claim 1, wherein the lost motion device is disposed between the auxiliary lever and the main lever and serves to limit the relative movement of these two levers.

7. A locking device as claimed in claim 1, wherein the movement increasing mechanism comprises a releasing lever pivoted to the main lever at a position displaced from the fulcrum of the main lever and connecting the auxiliary lever with the valve device.

JOHN KEITH SIMPSON.